United States Patent
Murdoch et al.

[11] Patent Number: 6,154,825
[45] Date of Patent: *Nov. 28, 2000

[54] METHOD AND APPARATUS FOR ADDRESSING A MEMORY RESOURCE COMPRISING MEMORY DEVICES HAVING MULTIPLE CONFIGURATIONS

[75] Inventors: Robert N. Murdoch, Sacramento; Michael W. Williams, Citrus Heights; Kuljit Bains; Narendra Khandekar, both of Folsom, all of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/814,733

[22] Filed: Mar. 7, 1997

[51] Int. Cl.[7] .................................................. G06F 12/10
[52] U.S. Cl. ........................................... 711/211; 711/220
[58] Field of Search ............................... 711/1, 2, 5, 101, 711/104, 167, 200, 211, 212, 220; 710/56; 365/189.01

[56] References Cited

U.S. PATENT DOCUMENTS

| | | | |
|---|---|---|---|
| 4,763,302 | 8/1988 | Yamada | 365/189.01 |
| 4,980,850 | 12/1990 | Morgan | 711/172 |
| 5,307,320 | 4/1994 | Farrer et al. | 365/230.01 |
| 5,420,995 | 5/1995 | Taguri | 711/211 |
| 5,446,860 | 8/1995 | Dresser et al. | 711/100 |
| 5,568,651 | 10/1996 | Medina et al. | 710/74 |
| 5,737,764 | 4/1998 | Shigeeda | 711/170 |
| 5,757,817 | 5/1998 | Bolyn et al. | 714/719 |
| 5,765,188 | 6/1998 | Colwell | 711/115 |
| 5,845,153 | 12/1998 | Sun et al. | 710/56 |

*Primary Examiner*—B. James Peikari
*Attorney, Agent, or Firm*—Blakely, Sokoloff, Taylor & Zafman LLP

[57] ABSTRACT

A method and apparatus for accessing a memory resource, such as an array of DRAM modules, is described. The methodology commences with the receipt of a memory address during a memory access cycle. A row address is then generated by selecting predetermined bits of the memory address as the row address. Concurrently with the generation of the row address, a determination is made as to the configuration of a memory device within the memory resource and targeted by the memory address. Thereafter, a column address is generated by selecting bits of the memory address as the column address based on the configuration of the targeted memory device. The time required for the determination of the configuration of the targeted memory device is thus absorbed within the time expended generating the row address.

14 Claims, 8 Drawing Sheets

FIG. 4

| | | | MA | 11 | 10 | 9 | 8 | 7 | 6 | 5 | 4 | 3 | 2 | 1 | 0 |
|---|---|---|---|---|---|---|---|---|---|---|---|---|---|---|---|
| ROW ADDRESS ALL CASES | | | | 22 | 21 | 20 | 19 | 18 | 17 | 16 | 15 | 14 | 13 | 12 | 11 |

COLUMN ADDRESS CASE 1 ROW >= 64M (FULLY SUPPORTED)                                      MAX

| SPLIT | DEPTH | ROW | | | | | | | | | | | | | |
|---|---|---|---|---|---|---|---|---|---|---|---|---|---|---|---|
| 12 x 12 | 16M | 128M | 26 | 25 | 24 | 23 | 10 | 9 | 8 | 7 | 6 | 5 | 4 | 3 | |
| 12 X 11 | 8M | 64M | >X< | 25 | 24 | 23 | 10 | 9 | 8 | 7 | 6 | 5 | 4 | 3 | |

COLUMN ADDRESS CASE 2 ROW = 32M

| 11 X 11 | 4M | 32M | >X< | 22 | 24 | 23 | 10 | 9 | 8 | 7 | 6 | 5 | 4 | 3 |
| 12 X 10 | 4M | 32M | >X< | >X< | 24 | 23 | 10 | 9 | 8 | 7 | 6 | 5 | 4 | 3 |

COLUMN ADDRESS CASE 3 ROW = 16M

| 11 X 10 | 2M | 16M | >X< | >X< | 22 | 23 | 10 | 9 | 8 | 7 | 6 | 5 | 4 | 3 |
| 12 X 9 | 2M | 16M | >X< | >X< | >X< | 23 | 10 | 9 | 8 | 7 | 6 | 5 | 4 | 3 |

COLUMN ADDRESS CASE 4 ROW = 8M OR ROW = 4M

| 10 X 10 | 1M | 8M | >X< | >X< | 22 | 21 | 10 | 9 | 8 | 7 | 6 | 5 | 4 | 3 |
| 10 X 9 | 1M | 8M | >X< | >X< | >X< | 21 | 10 | 9 | 8 | 7 | 6 | 5 | 4 | 3 |
| 12 X 8 | 1M | 8M | >X< | >X< | >X< | >X< | 10 | 9 | 8 | 7 | 6 | 5 | 4 | 3 |
| 10 X 9 | 512M | 4M | >X< | >X< | >X< | 21 | 10 | 9 | 8 | 7 | 6 | 5 | 4 | 3 |
| 11 X 8 | 512M | 4M | >X< | >X< | >X< | >X< | 10 | 9 | 8 | 7 | 6 | 5 | 4 | 3 |

COLUMN ADDRESS CASE 5 ROW > 4M

| 9 X 9 | 256K | 2M | >X< | >X< | >X< | 20 | 10 | 9 | 8 | 7 | 6 | 5 | 4 | 3 |
| 10 X 8 | 256M | 2M | >X< | >X< | >X< | >X< | 10 | 9 | 8 | 7 | 6 | 5 | 4 | 3 |
| 9 X 8 | 128K | 1M | >X< | >X< | >X< | >X< | 10 | 9 | 8 | 7 | 6 | 5 | 4 | 3 |
| 8 X 8 | 64K | 512M | >X< | >X< | >X< | >X< | 10 | 9 | 8 | 7 | 6 | 5 | 4 | 3 |

FIG. 5

| MA LINES | ROW ADDRESS MAPPING | COLUMN ADDRESS MAPPINGS |
|---|---|---|
| 0 | 11 | 3 |
| 1 | 12 | 4 |
| 2 | 13 | 5 |
| 3 | 14 | 6 |
| 4 | 15 | 7 |
| 5 | 16 | 8 |
| 6 | 17 | 9 |
| 7 | 18 | 10 |
| 8 | 19 | 23/21 |
| 9 | 20 | 24/22 |
| 10 | 21 | 25/22 |
| 11 | 22 | 26 |

92

METHOD AND APPARATUS FOR ADDRESSING A MEMORY RESOURCE COMPRISING MEMORY DEVICES HAVING MULTIPLE CONFIGURATIONS

FIELD OF THE INVENTION

The present invention relates to the addressing of memory arrays, and more particularly to addressing multiple DRAM modules of differing size and configuration within a memory array.

BACKGROUND OF THE INVENTION

It is common for computer systems employing Dynamic Random Access Memories (DRAMs) to use DRAM modules which support symmetric addressing (i.e. wherein a row address propagated to a DRAM memory array has the same number of bits as a column address). A memory controller typically receives a memory address from an external resource, such as a Central Processing Unit (CPU), which the memory controller then decodes into a row address and a column address. Where the memory location addressed by the memory address is located, merely for example, in a one megabit deep DRAM module with symmetric addressing, the memory controller firstly propagates a 10-bit row address to the DRAM module, followed by a 10-bit column address. A number of memory controllers simply perform a predetermined mapping of bits of a memory address to respective row and column addresses. The configuration and size of a DRAM module which can be utilized in conjunction with such a memory controller is thus dictated by the mapping scheme implemented by the memory controller.

The use of DRAM modules having a single configuration across an entire memory array is limiting for a number of reasons. For example, when DRAM modules are in short supply on the market, computer manufacturers may desire to use DRAM modules of configurations that are readily available to implement a memory array. Thus, a need has arisen for a memory addressing scheme which allows a single memory controller to address a memory array comprised of DRAM modules of varying sizes and configurations. Further, for memory upgrade purposes, it is undesirable that the configuration of a DRAM module that can be utilized within a computer system be dictated by a pre-installed memory controller.

SUMMARY OF THE INVENTION

According to a first aspect of the invention, there is provided a method of accessing a memory resource, such as a memory array, comprising a number of memory devices, such as DRAM modules. The method of the present invention commences with the receipt of a memory address at a memory controller during a memory access cycle. The memory controller then generates a row address by mapping predetermined bits of the memory address to a row address. A determination, which may be performed concurrently with the generation of the row address, of the configuration of a memory device addressed by the memory address is then made, and a column address is generated by selecting bits of the memory address as the column address. The selection, or mapping, of the memory address bits as the column address is based on and determined by the configuration of the memory device addressed by the memory address.

The row address is propagated to the memory resource, whereafter a row address strobe (RAS#) signal is asserted. The steps of generating the row address, propagating the row address to the memory resource, and asserting the RAS# signal comprise a row access period, and the determination of the configuration of the memory device is performed during this row access period. Accordingly, the determination of the configuration of the memory device is "hidden", or absorbed within, the row access period.

On receipt of a subsequent memory address, during a subsequent memory access cycle, a determination is made whether the memory address constitutes a page hit. If so, then the configuration of the memory device addressed by the subsequent memory address is determined, and a new column address is generated by selecting bits of the subsequent memory address as the new column address based on the configuration of the memory device addressed by the subsequent memory address.

On the other hand, if the subsequent memory address does not constitute a page hit, a new row address is generated by selecting pre-determined bits of the subsequent memory address as the new row address. Again, the new row address is independent of the configuration of the memory device being accessed, and a determination of the memory device configuration and the generation of a column address tailored to the memory device occur concurrently with the generation and propagation of the new row address.

According to a second aspect of the present invention, there is provided a memory decoder for decoding a memory address targeting a memory device, such as a DRAM module, in a memory array. The memory decoder comprises an input coupled to receive the memory address, a first selection circuit (such as a multiplexer) configured to select predetermined bits of the memory address as a row address, and second selection circuitry (such as a multiplexer) configured to select bits of the memory address as a column address based on the configuration of the memory device addressed by the memory address.

The memory decoder may also include configuration determination circuitry which determines the configuration of a memory device to be accessed, and outputs an appropriate signal to the second selection circuitry by which the second selection circuitry is operable to generate the column address.

In one embodiment, the first selection circuitry and the configuration determination circuitry are configured to operate concurrently, and thus simultaneously to select the predetermined bits of the memory address as a row address, and to determine the configuration of the memory device addressed by the memory address. The configuration determination circuitry may further be coupled to access a register which stores memory device configuration information, determined during boot-up of a computer system.

The second selection circuitry may be coupled to receive at least two bits of the memory address as input, and operable to output a selected one of these two bits based on the configuration of the memory device. The first selection circuitry is, in one embodiment, coupled to receive the output of the second selection circuitry as an input.

The present invention extends to a memory arrangement and a computer system incorporating a memory decoder as described above.

BRIEF DESCRIPTION OF THE DRAWINGS

The present invention is illustrated by way of example and not limitation in the figures of the accompanying drawings, in which like references indicate similar elements and in which:

FIG. 4 and FIG. 5 illustrate tables showing the mapping of address bits to row and column addresses according to one embodiment of the present invention.

DETAILED DESCRIPTION

A method and apparatus for addressing a memory resource comprising memory devices having multiple configurations and sizes is described. In the following description, for purposes of explanation, numerous specific details are set forth in order to provide a thorough understanding of the present invention. It will be evident, however, to one skilled in the art that the present invention may be practiced without these specific details.

Computer System Overview

Figure 1:
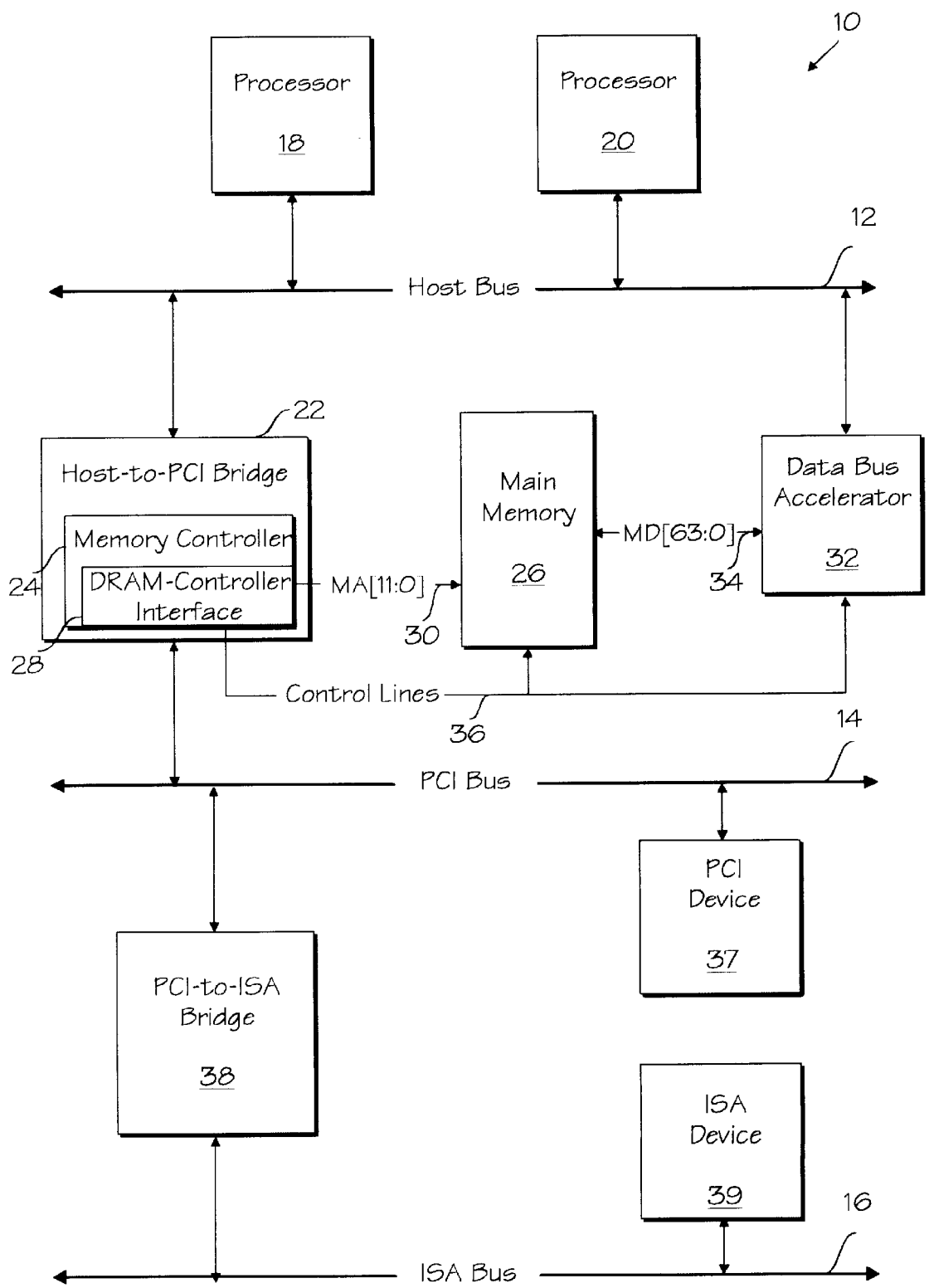
FIG. 1 is a diagrammatic illustration of a computer system in which the present invention may be implemented.

FIG. 1 shows an exemplary computer system 10 within which the present invention may be implemented. The various components of the computer system 10 are coupled to a number of primary busses, namely a host bus 12, a systems bus, which in one embodiment comprises a Peripheral Component Interconnect (PCI) bus 14 and a legacy bus, which may comprise an Industry Standard Architecture (ISA) bus 16. A pair of dual processors 18 and 20 are coupled to the host bus 12. A host-to-PCI bridge 22 is coupled, and provides communication, between the host bus 12 and the PCI bus 14. The bridge 22 incorporates a memory controller 24 which controls read and write access operations to a main memory 26 via an interface 28. Specifically, the memory controller 24 is coupled to receive memory addresses from devices, such as the processors 18 and 20, within the computer system 10, and sequentially to propagate row and column addresses to the main memory 26 via a memory address bus 30. Data is written to, and retrieved from, the main memory 26 by a data bus accelerator 32, via a memory data bus 34, the accelerator 32 being coupled to the host bus 12. The memory controller 24 controls and coordinates accesses to the main memory 26 via control lines 36. A number of PCI devices 37 and ISA devices 39 may be coupled to the PCI bus and the ISA bus 14 and 16 respectively, and a PCI-to-ISA bridge 38 is coupled between the PCI bus 14 and the ISA bus 16 to facilitate communication between devices coupled to the ISA bus 16 and other components of the computer system 10.

Main Memory-Overview

Figure 2:
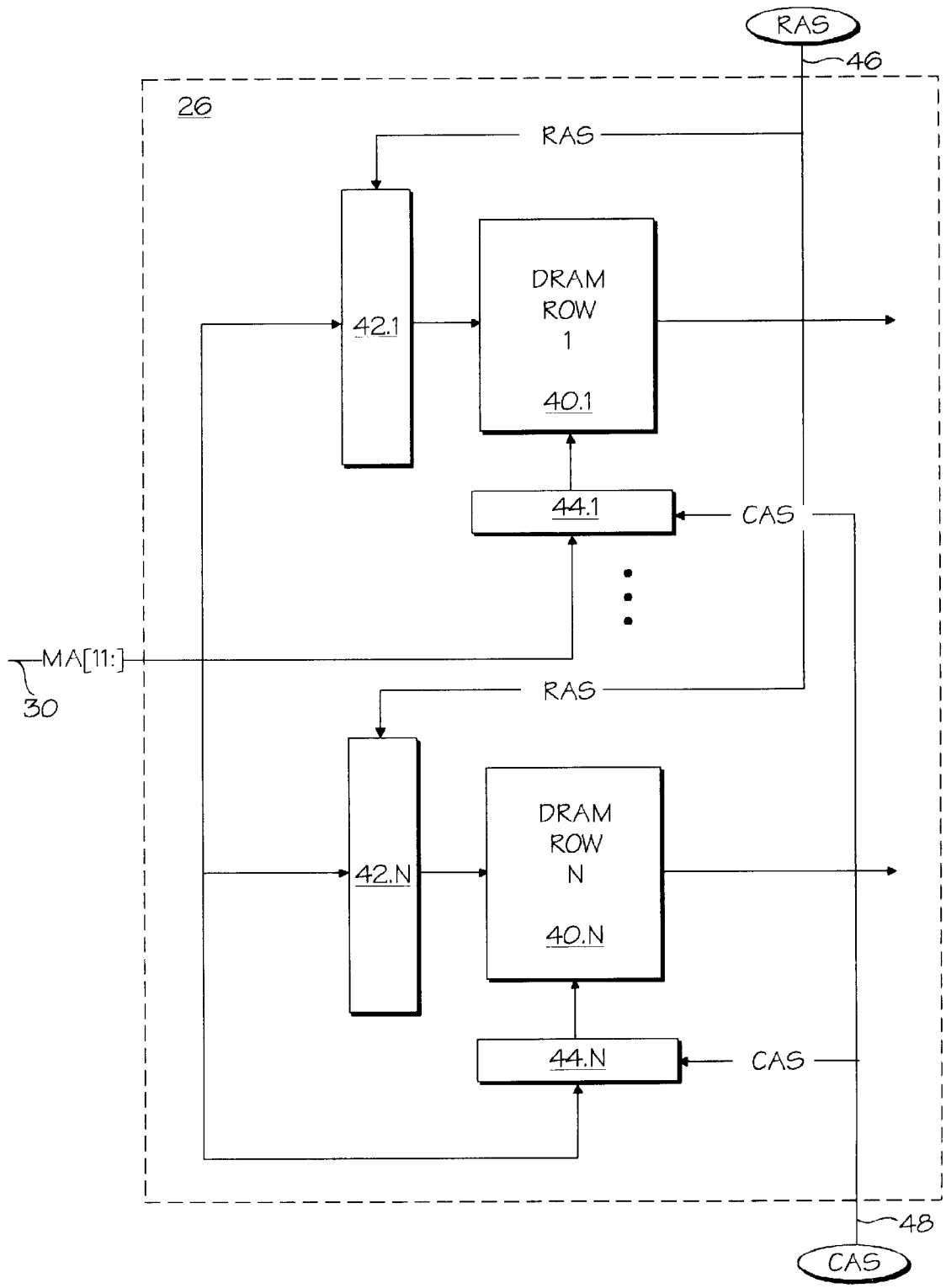
FIG. 2 is a diagrammatic illustration of a memory array in conjunction with which the present invention may be utilized.

FIG. 2 provides a diagrammatic representation of an exemplary embodiment of the main memory 26, which is shown to comprise an array of N rows 40.1–40.N of Dynamic Random Access Memory (DRAM) memory modules. Each DRAM row 40 is addressed by a specific row address, and each column is similarly addressed by a column address. Each DRAM row 40 may further be comprised of DRAM modules having any one of a number of configurations. Such configurations may either by symmetric or asymmetric. Examples of various memory organizations are listed below in Table 1. The addressing type (i.e. symmetric or asymmetric) and the address size for each of these memory organizations is also indicated in this table.

TABLE 1

| Memory Org. | Addressing | Address Size |
| --- | --- | --- |
| 4 Mb | | |
| 1 M × 4 | Symmetric | 10 × 10 |
| 16 Mb | | |
| 1 M × 16 | Symmetric | 10 × 10 |
| 2 M × 8 | Asymmetric | 11 × 10 |
| 4 M × 4 | Symmetric | 11 × 11 |
| | Asymmetric | 12 × 10 |
| 64 Mb | | |
| 4 M × 16 | Symmetric | 11 × 11 |
| | Asymmetric | 12 × 10 |
| 8 M × 8 | Asymmetric | 12 × 11 |
| 16 M × 4 | Symmetric | 12 × 12 |

The accessing of a memory location within the main memory 26 requires several steps, and is complicated when several different configurations of DRAM module are used therein, as will be described below. Each DRAM row 40 is shown in FIG. 2 to have row select circuitry 42, and column select circuitry 44 associated therewith. The row select circuitry 42 and the column select circuitry 44 are further each shown to be coupled to the memory address bus 30, which is a 12 bit bus. The memory address bus is multiplexed to propagate row and column addresses from the memory controller 24 to the row select circuitries 42 and the column select circuitries 44 respectively. The row select circuitries 42 are further coupled to receive a Row Address Strobe (RAS#) signal 46, responsive to the assertion of which the row select circuitries 42 latch a row address on the memory address bus 30. Similarly, the column select circuitries 44 are coupled to receive a Column Address Strobe (CAS#) signal 48 and to latch a column address on the memory address bus 30 responsive to the assertion of the CAS# signal 48.

Memory Access Cycle

Figure 3:
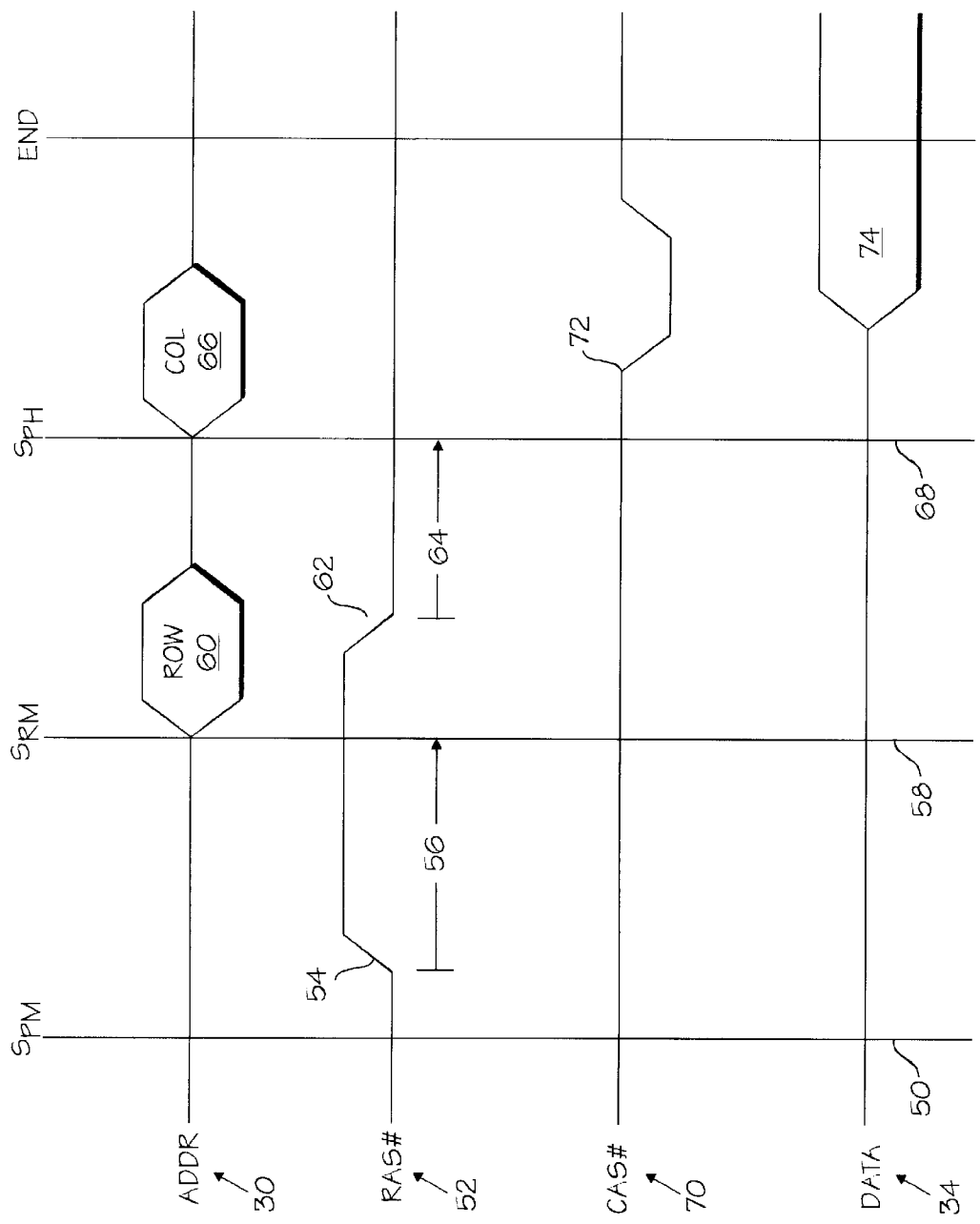
FIG. 3 is a timing diagram illustrating a page miss, a row miss and a page hit.

A description of the various forms of memory access cycle that can occur with respect to the main memory 26 will now be described with reference to FIG. 3. The form of a memory access cycle may be dependent upon the form and conditions of a previous memory access operation. A first form of memory access cycle is referred to as a "page miss" and commences at the time indicated at line 50 in FIG. 3. In a page miss cycle, a particular page of the main memory is open, but a received memory address targets another page (i.e. row). Accordingly, a RAS# signal 52 must be deasserted at point 54 for a pre-determined pre-charge period 56 so as to allow for the adequate precharging of a newly targeted DRAM module. On completion of the precharge period 56, and at the time indicated by line 58, a row address is multiplexed onto the memory bus 30, as indicated at point 60. At point 62, the RAS# signal 52 is asserted (i.e. driven low), in response to which row selection circuitry 42 latches the row address. A pre-determined time period 64 after the RAS# signal 52 has been driven low, the column address is multiplexed onto the memory address bus 30, at point 66, and at the time indicated by line 68. Shortly thereafter, a Column Address Strobe (CAS#) signal 70 is asserted at point 72, in response to which column select circuitry 44 latches the column address. The row and column addresses now having been latched, the address data 74 can be placed on the memory data bus 34 and either written to, or read from, the addressed memory location.

A second form of memory access cycle, termed a "row miss" occurs when no page is open prior to the access cycle, and the RAS# signal 52 has accordingly been deasserted for a sufficient time so as to ensure that adequate precharging has occurred. In this case, a memory access cycle can commence directly at the time indicated by line 58.

A third form of an access cycle, referred to as a "page hit", occurs when a page is open, and a memory address targets a location in the same page (i.e. row) as a memory address of an immediately preceding memory access cycle. In this case, it will be appreciated that it is not necessary to repeat the steps of mapping and latching the row address utilizing the row select circuitry, as the relevant row address will have already been latched. Accordingly, the memory access cycle can commence at line 68, which results in a "page hit" memory access cycle being shorter than either a "page miss" or "row miss" memory access cycle.

In computer systems including a main memory constructed using DRAM modules of varying configurations, memory access is complicated in that the memory controller, prior to performing a memory access, may be required to determine the size and configuration of an addressed DRAM module, and thus to determine the appropriate mapping of memory address bits to generate the row address and the column address. In one methodology, in a row miss scenario, a delay may be incurred so as to allow the memory controller to access registers which store information concerning the configuration of DRAM modules and to allow the memory controller to determine the appropriate mappings for both the row and column addresses. According to this methodology, the steps of determining the configuration of the addressed DRAM module, and of determining the appropriate mapping for at least the row address, occur prior to the commencement of a memory access cycle (i.e. prior to the time indicated by line 50 in FIG. 3). This approach is undesirable in view of the additional latency introduced into a memory access cycle when a row miss occurs, as the entire memory access cycle is stalled pending mapping of both the row and column addresses.

Overview of Invention

The present invention proposes a methodology and apparatus for performing a memory access, wherein upon commencement of a memory access requiring the multiplexing of a row address onto a memory bus, pre-determined bits of a memory address are mapped or selected to comprise the row address, independent of and without regard to the configuration of a DRAM module targeted by the relevant memory address. Accordingly, for all page miss and row miss memory access cycles, predetermined bits of the memory address will be selected as the row address. Referring to FIG. 4, one embodiment of such an invariant mapping or selection of memory address bits to comprise a row address is shown at 80. Specifically, the bit numbers, and order of these bit numbers, which comprise the invariant selection to generate the row address is shown. Further, the lines of the memory address bus 30, on which the memory address bits are placed, are also shown at 81. The invariant mapping of memory address bits to comprise a row address is particularly advantageous in that it avoids the latency, or delay, prior to the commencement of a memory access cycle in the case of a page miss or a row miss.

The present invention further proposes determining the configuration of a memory device, such as a DRAM module, concurrently with the generation of the row address, and the propagation of this row address to the main memory. In other words, with reference to FIG. 3, the present invention proposes that the configuration of the addressed DRAM module be determined in the time period between lines 50 and 68. In this way, the time required for the determination of the configuration can be "hidden", or absorbed within, the row access period between lines 50 and 68. As the configuration determination does not occur within the critical path of operations, this step does not does not introduce any delay into a memory access cycle. Once the configuration of the address DRAM module has been determined, a column address is generated by selecting bits of the memory address as the column address, based on the configuration of the relevant DRAM module. Referring to FIG. 4, tables 82, 84, 86, 88 and 90 illustrate the mappings of memory address bits to comprise column addresses for various configurations and sizes of DRAM module. The tables 82–90 also illustrate which lines of the memory address bus 30 carry which bits of the memory address. Blocks including a "X" constitute "don't care" bits. As will be appreciated from the tables 82–90, column addresses specific to DRAM modules are generated by placing varying bits of a memory address onto memory address lines 8, 9 and 10. This is most clearly illustrated in FIG. 5, which shows a table 92 which provides a summary of the tables 80–90 in FIG. 4. As is apparent from table 92, configuration-dependent column addresses are generated by selecting one of two memory address bits to be placed on memory address bus 30 lines 8, 9 and 10. It will of course be appreciated that the illustrated mappings are merely exemplary, and any other suitable mappings could be used to achieve the advantage of the present invention.

Thus, the present invention proposes accommodating DRAM modules of varying configuration and size within a single memory array by performing an invariant selection of memory address bits to comprise a row address, and performing a configuration-dependent selection of memory address bits to comprise the column address. Further, the step of determining the configuration of the address is performed concurrently with the generation and propagation of the row address.

Memory Address Decoder

Figure 6:
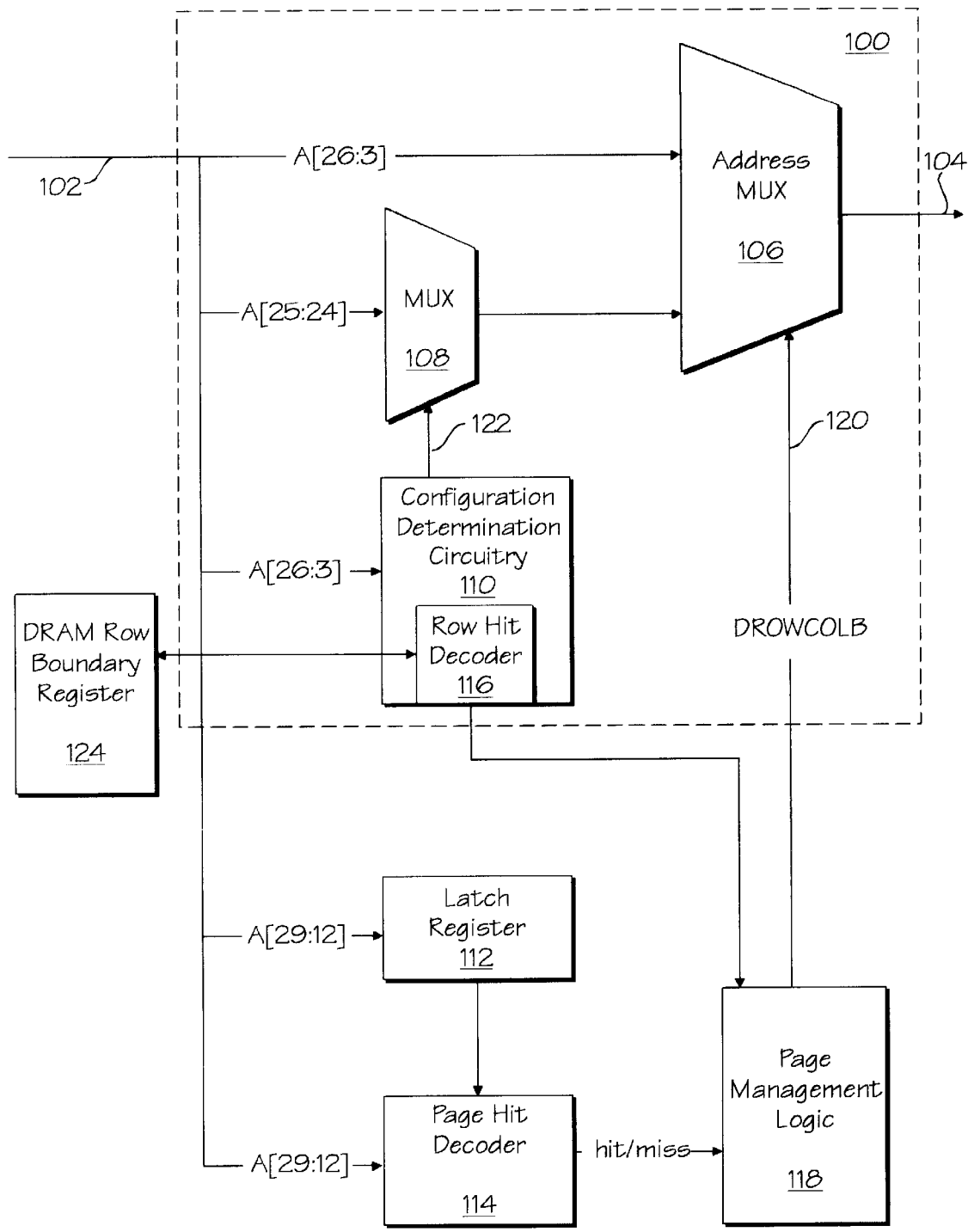
FIG. 6 is a block diagram illustrating a memory address decoder according to a further embodiment of the present invention.

FIG. 6 shows a memory address decoder 100 which is configured to implement the row and column address generation scheme according to the invention, but different from the example described above with reference to FIGS. 4 and 5. The memory address decoder 100 illustrates a simple embodiment of the invention, and it will readily be appreciated by those skilled in the art that this embodiment may be expanded to implement the address generation scheme illustrated in FIGS. 4 and 5. In one embodiment of the present invention, the memory address decoder 100 is incorporated within the memory controller 24, and is coupled to receive a 26-bit memory address on an address bus 102 from a processor, or other device within a computer system. The decoder 100 furthermore outputs 12-bit row and column addresses on a memory address bus 104, which is coupled to main memory. One embodiment of the memory address decoder 100 comprises the illustrated components, namely a primary address multiplexer (MUX) 106, a secondary MUX 108 and a configuration determination circuitry 110 which includes a row hit decoder 116. The decoder is supported by other circuitry within the memory controller, namely a latch register 112, a page hit decoder 114, and page management logic 118. It will of course be appreciated that all of these components need not be incorporated within the memory controller, but may be located elsewhere on an integrated circuit or elsewhere within a computer system.

The address MUX 106 is a 24-to-12 MUX, and is coupled to receive bits 3–26 of a memory address placed on the address bus 102, as well as the output of the secondary MUX 108. Responsive to an input signal 120 from the page management logic 118, the address MUX 106 is configured to select bits of the memory address as either a row address or a column address. The secondary MUX 108 is shown to receive bits 24 and 25 of the memory address as input and, responsive to an input signal 122 from the configuration determination circuitry 110, to output a selected one of these inputs to the primary address MUX 106. By selecting which of the memory address bits 24 or 25 is propagated to the primary address MUX 106, the secondary address MUX 108 determines the constitution of a column address outputted from the primary MUX 106. The configuration determination circuitry 110 is coupled to receive bits 3–26 of the memory address, and the row hit decoder 116 is coupled to access a DRAM row boundary register 124, which is initialized with information concerning the size and configuration of DRAM rows upon boot-up of the computer system. The details of the initialization of the boundary register 124 with row size and configuration information is not pertinent to an understanding of the present invention.

The latch register 112 serves to latch a memory address from an immediately preceding memory access cycle, and to supply this preceding memory address to the page hit decoder 114, so as to allow the page hit decoder 114 to compare the preceding memory address with a current memory address and thus to determine whether a page hit has occurred. For each memory access cycle, the page hit decoder 114 indicates to page management logic 118 whether a page hit has occurred or not. The row hit decoder 116 similarly functions to inform page management logic 118 of the occurrence or non-occurrence of a row hit. Based on the inputs from the page hit decoder 114 and the row hit decoder 116, the page management logic 118 is able to ascertain whether both a row address and a column address must be multiplexed onto the memory address bus 104 or not.

Figure 7:
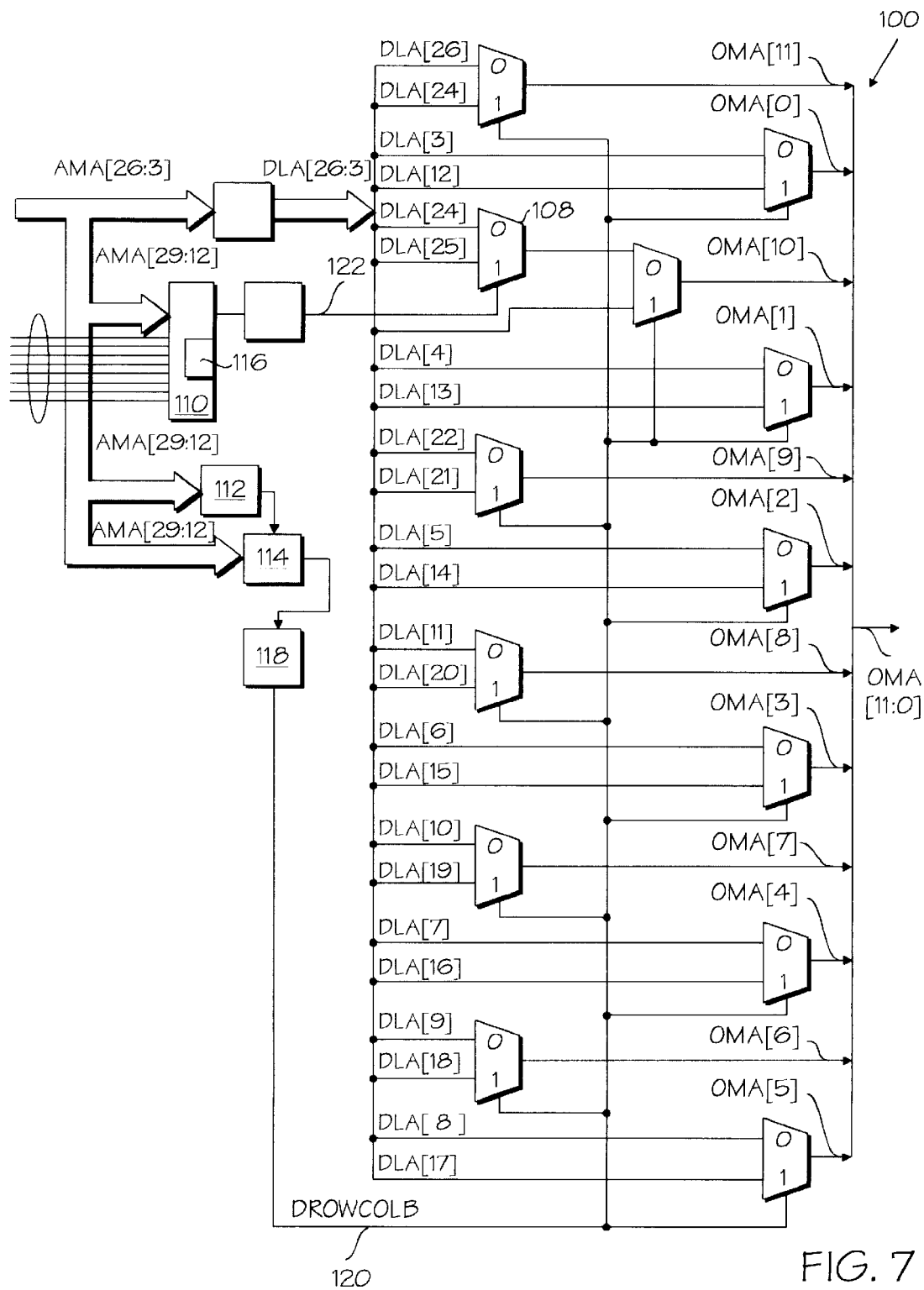
FIG. 7 is a more detailed schematic illustration of one embodiment of a memory address decoder according to the present invention.

FIG. 7 shows a more detailed schematic of an embodiment of a memory address decoder 100 according to the invention. In the embodiment illustrated in FIG. 7, the address MUX 106 is shown to comprise a bank of 2-to-1 MUXs, and the secondary MUX 108 is shown to be incorporated within this bank of MUXs.

Methodology for Performing a Memory Access

Figure 8:
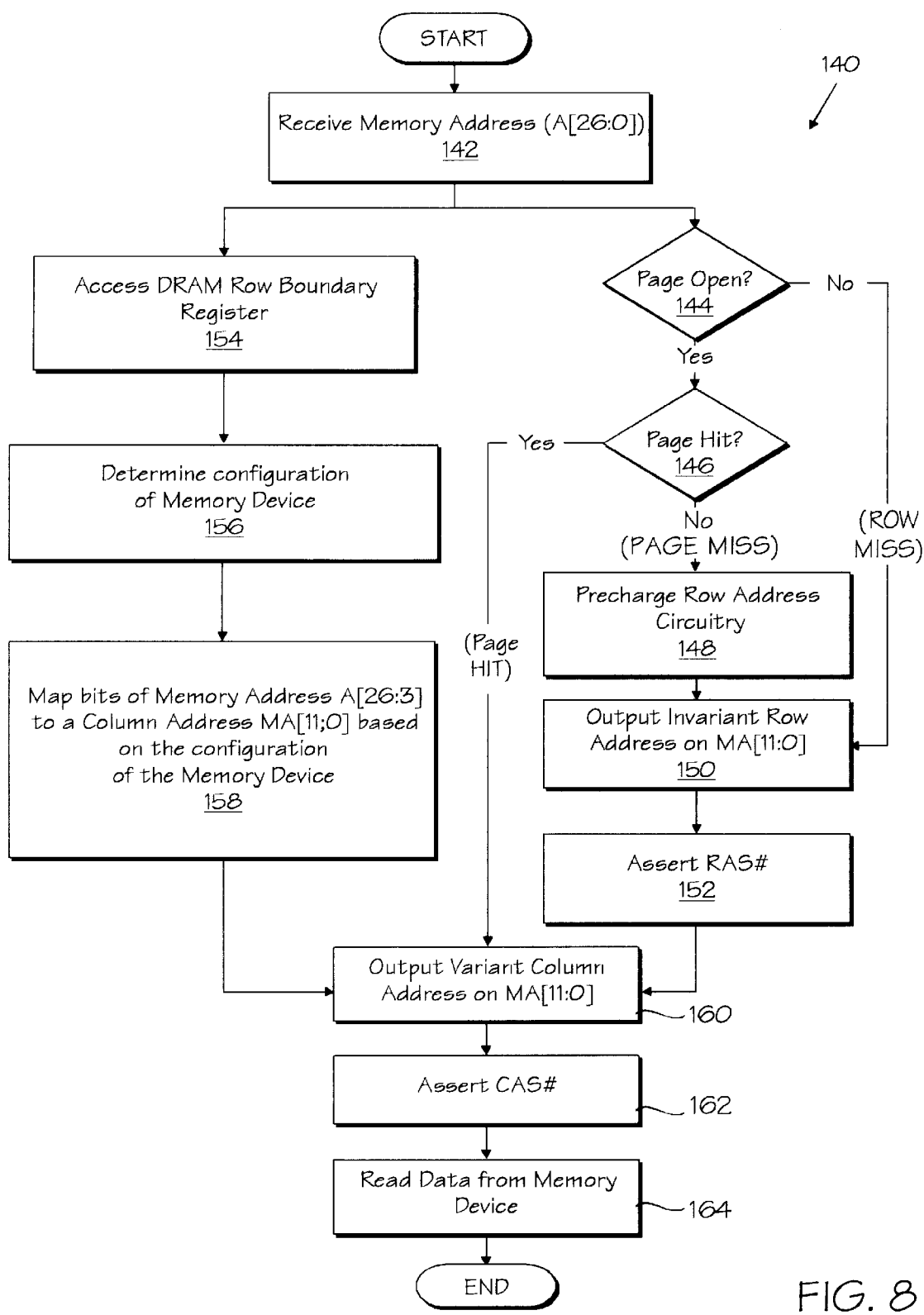
FIG. 8 is a flow chart illustrating a method of accessing a memory resource according to one embodiment of the present invention.

A method 140 of accessing a memory resource, according to the present invention and utilizing the apparatus described above with reference to FIG. 6, will now be described with reference to the flowchart shown in FIG. 8. The method 140 commences with the receipt, shown at step 142, of a memory address at the decoder 100, via the address bus 102. As shown in FIG. 8, the method 140 then comprises two series of steps which are performed concurrently and in parallel. Immediately upon receipt of the memory address, a determination is made at step 144 as to whether a page is open for the memory address. This determination is made by the row hit decoder 116. If a page is open, the method 140 proceeds to determine, at step 146, whether a page hit has occurred. This determination is made by the page hit decoder 114. If not, a page miss is registered, and the row address selection circuitry precharge period, indicated at 56 in FIG. 3, is commenced at step 148. On completion of the precharge period 56, or should a row miss be identified at step 144, the method proceeds to step 150, where the address MUX 106, responsive to the input signal 120 received from page management logic 118, outputs a row address on the memory address bus 104. The row address outputted at step 150 comprises an invariant mapping of preselected bits of the memory address, and is independent and unaffected by the configuration or size of the memory device targeted by the memory address received at step 142. Accordingly, in the row and page miss scenarios described above, no delay is incurred in the generation of the row address, as it is invariantly mapped from the memory address bits. Once the row address has been placed on the memory address bus 104, the RAS# signal is asserted at step 152.

On the other hand, should it be determined at step 146 that a page hit has in fact occurred, the methodology bypasses the steps indicated at 148–152, as the row address latched by row address selection circuitry is valid, and there is no need for the address MUX 106 to output a further row address.

Concurrently with the performance of steps 144–152, the method 140 requires that the configuration determination circuitry 110, and specifically the row hit decoder 116, access the DRAM row boundary register 124 at step 154. At step 156, the configuration of the targeted memory device is determined by the configuration determination circuitry 110. At step 158, based on the configuration of the targeted memory device, a column address is generated by selecting memory address bits as the column address, based on the configuration of the targeted memory device. Specifically, the secondary MUX 108, responsive to the input signal 112 received from the configuration determination circuitry 110, outputs a selected one of the address bits (24 or 25) to the address MUX 106. The selected output of the MUX 108 is then incorporated within a column address outputted from the address MUX. Accordingly, the output of the secondary MUX 108 determines the mapping of the memory address bits to constitute a column address. While the MUX 108 is shown in FIG. 6 to select between only two bits of the memory address, it will readily be appreciated that the secondary MUX 108 could be modified to select between any number of memory address bits. For example, the mapping scheme illustrated in FIGS. 4 and 5 could be implemented.

At step 160, the column address is outputted on the memory address bus 104, whereafter the CAS# signal 106 is asserted at step 162. The row and column addresses thus having being latched by row and column selection circuitry, data can then be read from, or written to, the targeted memory device at step 164.

The above-described invention is particularly advantageous in that it allows a memory array comprised of DRAM modules of varying size and configuration to be addressed without any performance penalty being incurred as a result of having to determine the configuration of a targeted memory device. The time required for this configuration determination step is, according to the teachings of the present invention, hidden or absorbed within the time period in which an invariant selection of a row address, and the propagation of this row address, occur.

Thus, a method and apparatus of addressing a memory resource comprising memory devices having multiple configurations have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of accessing a memory resource comprising a plurality of memory devices, the method including:

responsive to receiving a memory address during a memory access cycle, generating a row address by selecting predetermined bits of the memory address as the row address, the selection of the predetermined bits as the row address being performed independent of a configuration of a memory device addressed by the memory address;

determining the configuration of the memory device addressed by the memory address; and generating a column address by selecting bits of the memory address as the column address based on the configuration of the memory device addressed by the memory address, wherein the generation of the row address is performed concurrently with the determination of the configuration of the memory device.

2. The method of claim 1 including propagating the row address to the memory resource and asserting a row address strobe (RAS#) signal, wherein the generating of the row address, propagating the row address and asserting the RAS# signal comprise a row access period, and wherein the determination of the configuration of the memory device is performed during the row access period.

3. The method of claim 1 including:

receiving a subsequent memory address during a subsequent memory access cycle;

determining whether the subsequent memory address constitutes a page hit; and if the subsequent memory address constitutes a page hit, then determining the configuration of a memory device within the memory resource addressed by the subsequent memory address, and generating a subsequent column address by selecting bits of the subsequent memory address as the subsequent column address based on the configuration of the memory device addressed by the subsequent memory address.

4. The method of claim 3 wherein, if the subsequent memory address does not constitute a page hit, then commencing a subsequent row access period comprising generating a subsequent row address by selecting predetermined bits of the subsequent memory address as the subsequent row address, propagating the subsequent row address to the memory resource and asserting the RAS# signal.

5. A memory decoder to decode a memory address targeting a memory device in a memory resource, the memory decoder comprising:

an input to receive a memory address;

first selection circuitry to select and output predetermined bits of the memory address as a row address independent of a configuration of a memory device targeted by the memory address;

configuration determination circuitry to determine the configuration of the memory device targeted by the memory address; and second selection circuitry to select bits of the memory address as a column address based on the configuration of the memory device targeted by the memory address, wherein the first selection circuitry and the configuration determination circuitry are configured concurrently to select the predetermined bits of the memory address as a row address, and to determine the configuration of the memory device targeted by the memory address.

6. The memory decoder of claim 5 wherein the configuration determination circuitry is coupled to access a register storing memory device configuration information.

7. The memory decoder of claim 5 wherein the first selection circuitry comprises a primary address multiplexer arrangement and the second selection circuitry comprises a secondary address multiplexer arrangement, wherein the secondary address multiplexer arrangement is coupled to receive at least two bits of the memory address as input, and operable to output a selected one of the at least two bits based on the configuration of the memory device targeted by the memory address, and wherein the primary address multiplexer is coupled to receive the output of the secondary multiplexer as an input.

8. A memory arrangement comprising:

a memory resource comprising a plurality of memory devices; and a memory addressing circuit to receive a memory address, to select predetermined bits of the memory address as a row address without utilizing knowledge of a configuration of a memory device addressed by the memory address, to determine the configuration of a memory device addressed by the memory address, and to select bits of the memory address as a column address based on the configuration of the memory device addressed by the memory address, wherein the memory addressing circuit is concurrently to select the predetermined bits of the memory as a row address, and to determine the configuration of the memory device addressed by the memory address.

9. The memory arrangement of claim 8 wherein the memory addressing circuit includes a configuration determination circuit coupled to receive the memory address, and to access a register storing memory device configuration information so as to identify the configuration of the memory device addressed by the memory address.

10. The memory arrangement of claim 9 wherein the configuration determination circuit is to output a selection signal based on the configuration of the memory device addressed by the memory address, and wherein an address multiplexer arrangement is coupled to receive, and is operable by, the selection signal to select one of at least two bits of the memory address for inclusion in the column address.

11. A method of accessing a memory resource including a memory device, the method comprising:

responsive to receiving a memory address during a memory access cycle, generating a row address utilizing first selection circuitry to select predetermined bits of the memory address as the row address, the selection of the predetermined bits as the row address being performed by the first selection circuitry independent of a configuration of a memory device targeted by the memory address;

determining the configuration of the memory device targeted by the memory address utilizing configuration determination circuitry, the determination of the configuration of the memory device being determined concurrently with the generation of the row address by the first selection circuitry; and generating a column address utilizing second selection circuitry to select bits of the memory address as the column address based on the configuration of the memory device, as determined by the configuration determination circuitry.

12. The method of claim 11 further comprising propagating the row address to the memory resource and asserting a row address strobe signal, the generation of the row address, propagation of the row address and the assertion of the row address strobe signal comprising a row access period, the determination of the configuration of the memory device being performed by the configuration determination circuitry during the row access period.

13. A memory decoder for decoding a memory address targeting a memory device in a memory resource, the memory decoder comprising:

first selection means for selecting and outputting predetermined bits of the memory address as a row address without regard to a configuration of the memory device targeted by the memory address;

configuration determination means for determining the configuration of the memory device targeted by the memory address concurrently with the selection and outputting of the predetermined bits by the first selection means; and second selection means for selecting bits of the memory address as a column address based on the configuration of the memory device targeted by the memory address.

14. A memory arrangement comprising:

memory means comprising a plurality of memory devices; and memory addressing means for receiving a memory address, for selecting predetermined bits of the memory address as a row address, for determining a configuration of a memory device address by the memory address, and for selecting bits of the memory address as a column address based on the configuration of the memory device addressed by the memory address, the memory addressing means for selecting the predetermined bits as the row address without dependence on the configuration of the memory device.

* * * * *